United States Patent [19]

Tajima et al.

[11] Patent Number: 4,980,617
[45] Date of Patent: Dec. 25, 1990

[54] SPEED CONTROL APPARATUS OF MOVABLE EQUIPMENT

[75] Inventors: Fumio Tajima, Juo; Hiroshi Katayama, Hitachi; Tunehiro Endo, Hitachioota; Kunio Miyashita, Hitachi; Seiichi Narushima, Naka; Jun Ohya, Katsuta; Kouchi Saito, Kitaibaraki, all of Japan

[73] Assignee: Hitachi, Ltd., Tokyo, Japan

[21] Appl. No.: 310,197

[22] Filed: Feb. 14, 1989

[30] Foreign Application Priority Data

| Feb. 24, 1988 | [JP] | Japan | 63-39424 |
| May 23, 1988 | [JP] | Japan | 63-123804 |
| Jun. 1, 1988 | [JP] | Japan | 63-132753 |
| Jul. 13, 1988 | [JP] | Japan | 63-172750 |

[51] Int. Cl.$^5$ ............................................. H02P 6/02
[52] U.S. Cl. ................................. 318/254; 318/609; 318/632
[58] Field of Search ............ 318/138, 254, 439, 460, 318/596, 609, 610, 632, 461

[56] References Cited

U.S. PATENT DOCUMENTS

| 3,878,411 | 4/1975 | Nocito et al. ................ 318/38 X |
| 4,163,928 | 8/1979 | Patterson et al. ............ 318/636 X |
| 4,445,080 | 4/1984 | Curtiss ........................ 318/806 X |
| 4,626,754 | 12/1986 | Habermann et al. .......... 318/460 |
| 4,652,989 | 3/1987 | Kurosawa et al. ............ 318/808 X |
| 4,703,243 | 10/1987 | Ettelman et al. ............. 318/685 X |

Primary Examiner—Bentsu Ro
Attorney, Agent, or Firm—Antonelli, Terry, Stout & Kraus

[57] ABSTRACT

A speed control apparatus is provided for controlling a speed of a movable equipment in such a way that the speed of the movable equipment is detected, calculates a deviation value between a detected speed of the movable equipment and a speed instruction signal, and controls the speed of the movable equipment based on the deviation value. The speed control equipment detects harmonic wave components included in the detected speed and reduces the harmonic wave components from the speed instruction signal so as to control the speed of the movable equipment.

18 Claims, 10 Drawing Sheets

SPEED CONTROL APPARATUS OF MOVABLE EQUIPMENT

FIELD OF THE INVENTION

The present invention relates to a speed control apparatus of a movable equipment. More specifically, the present invention relates to a control apparatus which should not change the speed thereof at operation. For instance, the present invention is applied to a motor used for a video tape recorder (VTR).

BACKGROUND OF THE INVENTION

It is desired that a speed of a motor used for a VTR be constant. When the speed is varied causing such as speed variation, speed ripple, or torque ripple, a picture of the VTR is disturbed and a reliability thereof is remarkably decreased.

Conventionally, an apparatus in this field chiefly uses a DC motor. Recently, a brushless motor has been used for the apparatus since a speed of the motor is/able to be changed freely and simply.

Since the brushless motor has no mechanical brushes, it does not suffer from abrasion of brushes and commutators or trouble caused by abrasion powder of the brushes and commutators of the motor. On the contrary, magnetic flux linkage numbers at conducting coils of 120 degree conducting type brushless motor are changed corresponding to rotor positions causing the torque ripple so that the speed variation is produced.

Suppose that a magnetic flux linkage number of a driving phase is $K(\theta)$, wherein $\theta$ is a position of the movable equipment.

A generated torque is represented by $K(\theta)$ I, wherein I is a current value passing through the coils.

When a conducting current is constant, the torque ripple is generated proportional to $K(\theta)$ as well as the magnetic flux linkage numbers.

On the other hand, an example, whose conducting current to the coils is $1/K(\theta)$ corresponding to the rotational positions of the rotor, is disclosed in FIGS. 2 and 3 of Japanese Patent Laid-Open No. 55-79694 published on June 16, 1980 entitled "Motor Control Circuit".

Such a conventional motor control circuit discloses that an information of $1/K(\theta)$ is stored to a ROM (Read Only Memory) previously corresponding to a rotational position of a rotor, the information of $1/K(\theta)$ is obtained from the ROM corresponding to the rotational position, and a current instruction signal is compensated to $1/K(\theta) \cdot I_\tau$ so that a constant torque is obtained, wherein $I_\tau$ is a current instruction value.

Moreover, a brushless motor having a core generates a large speed variation caused by cogging torque.

Since the magnetic flux linkage number $K(\theta)$ is varied based on states of magnetized distributions of permanent magnets, and arrangements of the wounded coils of the conventional motor control circuit disclosed in Japanese Patent Laid-Open No. 55-79694, it is difficult to detect the compensation signal $1/K(\theta)$ correctly in each motor.

Although the cogging torque is generated at the motor which has core, a magnitude and a phase of the cogging torque are varied remarkably depending on unbalanced magnetizing states and assembling errors of the core. It is impossible to compensate the torque ripple and speed variation perfectly based on the data memorized at the ROM.

A learning control method for suppressing the torque ripple is disclosed, for instance, in FIGS. 3 and 4 of Japanese Patent Laid-Open No. 61-173690 published on Aug. 5, 1986 entitled "Speed Control Apparatus of Motor" in which integration terms used for speed control are prepared independently corresponding to the rotational positions and these integration terms are changed over sequentially corresponding to the rotor positions.

However, in the method disclosed in Japanese Patent Laid-Open No. 61-173690, many Random Access Memory (RAMs) have to be prepared corresponding to the pulse numbers generated from a Frequency Generator (FG) so that the method has a drawback that a control apparatus becomes complex and high in cost.

SUMMARY OF THE INVENTION

An object of the present invention is to provide a speed control apparatus used for a movable equipment which is able to reduce torque ripple and speed variation easily when a controlled equipment is replaced and to minimize numbers of RAMs. The present invention contains in case that the movable equipment comprises a driving portion, a transmitter and a driven portion connected to the driving portion.

A subject of the present invention is a speed control apparatus comprising a movable equipment, a speed detector for detecting a moving speed of the movable equipment and a speed control means for providing a current or voltage instruction signal to the movable equipment based on a deviation value between a detected speed signal obtained from the speed detector and an instruction signal. The speed control means comprises a driver for providing a current or voltage signal to the movable equipment corresponding to a magnitude of the instruction signal, a speed detecting circuit for detecting a speed based on a signal from the speed detector and a microcomputer which obtains a deviation signal which is obtained by comparing the speed instruction signal and a speed signal obtained from the speed detecting circuit and drives the driver based on the deviation signal. The microcomputer comprises a harmonic wave component detecting means for detecting a harmonic wave component included in a speed variation mode which is obtained from the speed detecting circuit and a compensation means for supplying a compensation value to the driver so as to decrease the harmonic wave component detected by the harmonic wave component detecting means from the deviation signal.

In above system of the present invention, since the harmonic wave component detecting means is able to detect the harmonic wave component or the frequency component included in the actual speed variation mode of the motor, the microcomputer can adjust the current or voltage instruction signal which is provided to the driver by cancelling or decreasing the harmonic wave component detected by the harmonic wave detecting means in the microcomputer.

DETAILED DESCRIPTION OF THE PREFERRED EMBODIMENTS

Figure 1:
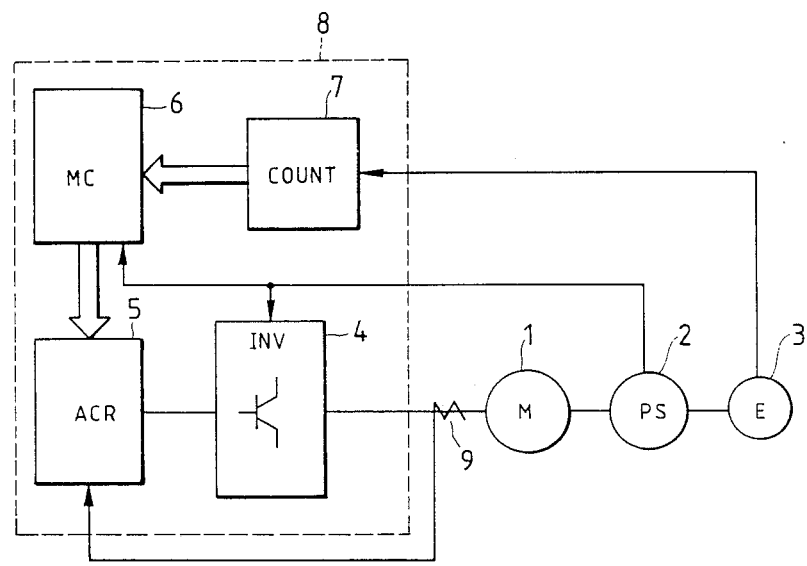
FIG. 1 is a block diagram showing one embodiment of the present invention.

FIG. 1 shows a speed control apparatus in which the brushless motor is used as a movable equipment.

In FIG. 1, 1 denotes a motor as a movable equipment which varies its torque and speed periodically in one rotation. As the motor 1, either a rotational type motor or linear type motor can be applied in the embodiment of the present invention. Although a brush type motor can be used in the present invention, the brushless type motor is more preferable. In the present invention, the motor 1, which is connected to a load and varies its speed, is called a movable equipment. 2 denotes a magnetic pole position detector used for detecting the position of motor 1, especially the position of the rotor of the motor. The magnetic pole position detector is used for changing over a phase current of the motor 1. Although an internal structure of the motor 1 is not disclosed, the brushless motor is formed so that the position of the rotor is detected electronically and current flows to two phase windings which are selected corresponding to the position of the rotor. 3 denotes a speed detector comprising an encoder which is mounted on a rotor shaft of the motor. As a speed detector, the frequency generator, tachometer generator, or pulse generator is able to be adopted besides the encoder. 4 denotes a driver used for driving the motor. The driver comprises an inverter. The inverter constitutes three positive and negative arms by six switching elements. The inverter enables current flow to the selected two phase windings and varies a magnitude of the current. 5 denotes an automatic current regulator (ACR) which inputs detected current obtained by a current transformer (CT). 6 denotes a microcomputer (MC), and 7 a speed detector comprising a counter (COUNT). The counter detects pulse numbers or pulse intervals detected by the speed detector 3 during a constant sampling interval. A speed control means 8 comprises the microcomputer 6, the automatic current regulator 5, the driver 4 and the speed detector 7.

The speed detected by the speed detecting circuit 7 is transmitted to the microcomputer 6. The outputted signal from the magnetic pole position detector 2 is also transmitted to the microcomputer 6 and the driver 4. The microcomputer 6 carries out ON and OFF controls of the switching element of the driver and regulates the control current value by processing the signals from the speed detecting circuit 7 and the detector 2.

Figure 2:
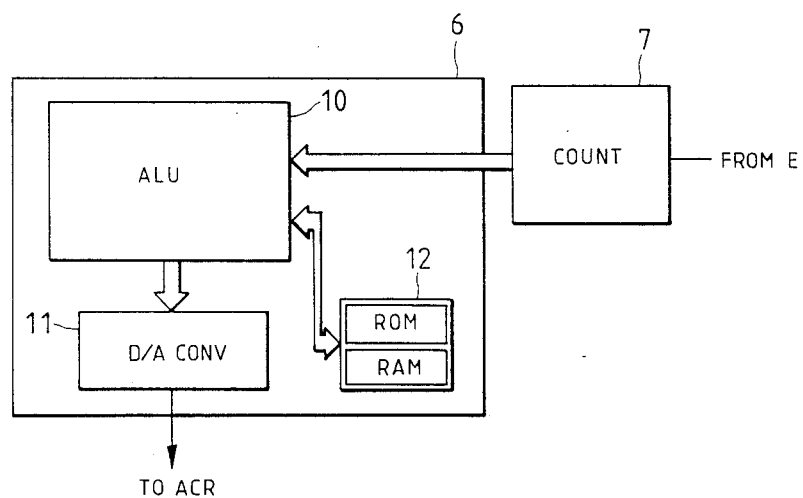
FIG. 2 is a block diagram of a microcomputer shown in FIG. 1.

The microcomputer 6 is constituted as shown in FIG. 2. Namely, the microcomputer 6 comprises an arithmetic and logic unit 10 (ALU) receiving an input from the counter 7 (COUNT), a D/A converter 11 (DA) and a memory 12 (MRY). The counter 7 measures a period of a pulse signal from the encoder 3 and detects the speed of the motor 1 based on a reciprocal of a period of the pulse signal. The arithmetic and logic unit 10 is inputted the signal from the counter and calculates a speed error by comparing the signal from the counter 7 and an instruction speed memorized at the ROM of the memory 12. Next, a compensation signal is produced based on the speed error signal. The compensation signal is memorized to the RAM of the memory 12 in order and the RAM is renewed by the new data inputted from the arithmetic and logic unit 10. Moreover, the arithmetic and logic unit 10 has an element for detecting the harmonic wave component included in an actual speed mode detected by the speed detecting circuit 7 as explained later. A detection of the harmonic wave component is carried out aiming at the detection of a fundamental wave component and especially the detection of the wave components which cause the torque ripple, for instance, such as the third and the 5th harmonic wave components. Although the counter 7 is located outside the microcomputer 6 in FIG. 2, the counter 7 can be provided inside the microcomputer 6.

Figure 3:
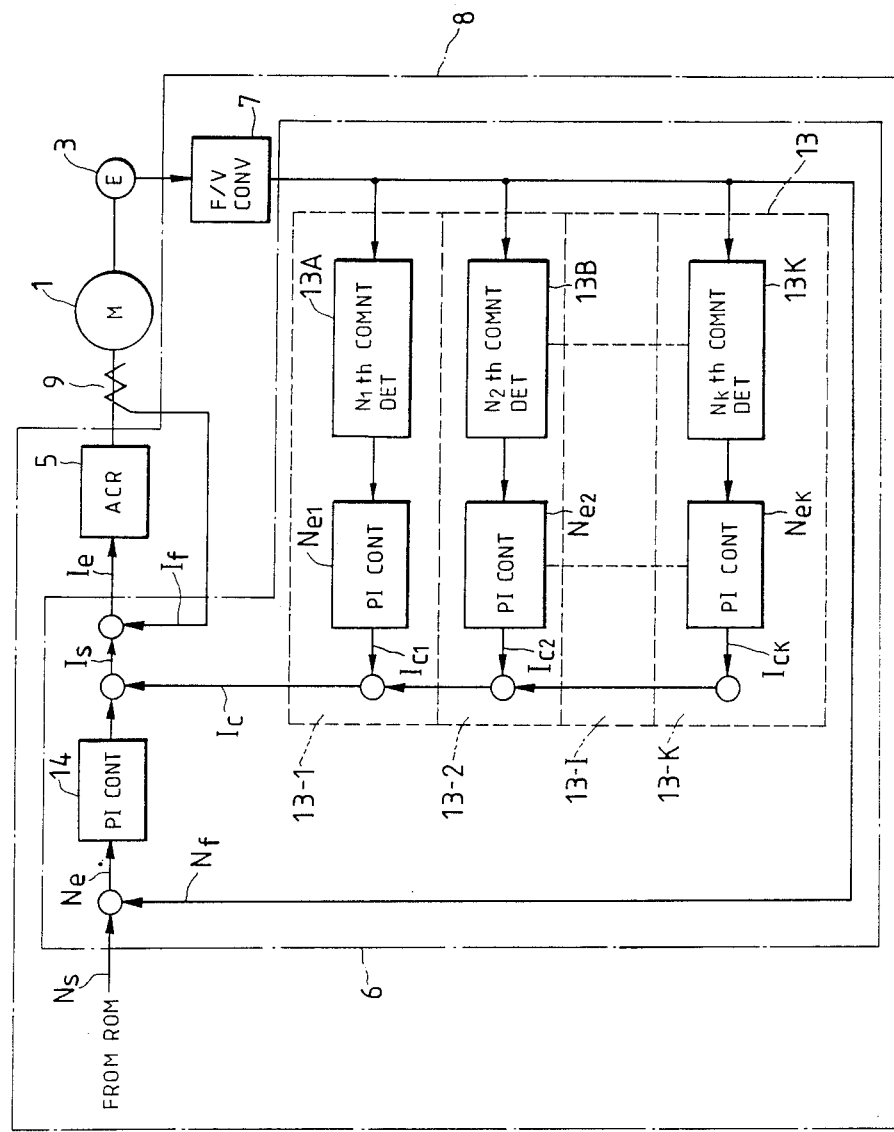
FIG. 3 is the first circuit diagram showing harmonic wave component detecting means in FIG. 1.

FIG. 3 discloses a concrete block diagram of the speed control apparatus of the present invention. A speed signal $N_f$ is detected in such a way that pulse numbers outputted from a basic oscillator (not shown) enclosed in the microcomputer, which are counted during a pulse interval of the speed detector 3, are counted, and the speed signal $N_f$ is calculated based on a reciprocal of the pulse numbers. After that the speed signal $N_f$ is introduced to the microcomputer 6. Within the microcomputer 6, a speed deviation signal Ne is calculated based on a difference between the speed instruction signal Ns from the ROM and the speed signal $N_f$, a proportional-plus-integral control (PI control) of the speed signal $N_f$ is carried out and a new current instruction signal Is is outputted by the processing of the software at the microcomputer 6. The current control system is made of a hardware. A current error signal Ie is calculated from the current instruction signal Is based on the speed instruction signal Ns and a current detected value If obtained from the current transformer 9. The current error signal Ie is introduced to the motor 1 via the D/A converter 11 (not shown in FIG. 3), the automatic current regulator 5, and the driver 4 (not shown in FIG. 3).

Although the above-mentioned structure is well known as a prior art, the present invention resides in a harmonic wave component detecting means 13 shown by the dotted line in FIG. 3. The harmonic wave component detecting means 13 calculates the harmonic wave components or frequency components included in the speed signal $N_f$ or the speed deviation signal Ne, produces compensation signals by the proportional control (P control) or the proportional-plus-integral control (PI control) of the harmonic wave components and adds the proportional control signals or the proportional-plus-integral control signals to the current instruction signal $I_s$. 13-1, 13-2, ---, 13-I, --- 13-K denote the $N_1$th, $N_2$th, ---, $I$th, --- $K$th harmonic wave component detecting means, respectively. 13A, 13B, ---, 13I, --- 13K denote the $N_1$th component detecting means, the $N_2$th component detecting means, ---, the $N_i$th component detecting means (not shown), --and the $N_K$th component detecting means, respectively. These component detecting means are connected to the PI control means $N_{e1}$, $N_{e2}$, --- $N_{ei}$ (not shown), ---, $N_{ek}$, respectively. The output signals $I_{c1}$, $I_{c2}$, ---, $I_{ci}$ (not shown), ---, $I_{ck}$ from the PI controllers $N_{e1}$, $N_{e2}$, ---, $N_{ei}$, ---$N_{ek}$ are added as a compensation signal $I_c$. The compensation signal $I_c$ is added to the current instruction signal $I_s$. These output signals of $I_{c1}$, $I_{c2}$, --- $I_{ck}$ can be provided in parallel to the current instruction signal $I_s$. The harmonic wave components and the numbers thereof can be varied freely corresponding to the motor controlled.

FIG. 4(a) shows a waveform of the speed variation of the motor 1 during one rotation of the motor. The pulse numbers generated from the encoder 3 is $N_k$ per one rotation of the motor 1. The calculation for detecting the speed of the motor is carried out one time within the interval of one pulse from the speed detector. The speed $N_f$ is obtained from the reciprocal of the pulse numbers generated from the basic oscillator enclosed in the microcomputer within the pulse interval of the encoder 3. Actually, the pulse numbers are counted by the counter 7. The speed signal $N_f$ is shown by FIG. 4(a).

Generally, the speed $N_f(\theta)$ can be exploded to each frequency component according to the following formula.

$$N_f(\theta) = N_o + \sum_{n=1}^{n=\infty} a_n \sin n\theta + b_n \cos n\theta \quad (1)$$

wherein, $N_o$ ---- DC component, $a_n$ --- coefficient of sine, $b_n$ --- coefficient of cosine.

The absolute values of $N_o$, $a_n$ and $b_n$ for arbitrary frequency components are expressed as follows:

$$N_o = \frac{1}{2\pi} \int_{-\pi}^{\pi} N_f(\theta) d\theta \quad (2)$$

$$a_n = \frac{1}{2\pi} \int_{-\infty}^{\pi} N_f(\theta) \sin n\theta \, d\theta \quad (3)$$

$$b_n = \frac{1}{2\pi} \int_{-\infty}^{\pi} N_f(\theta) \cos n\theta \, d\theta \quad (4)$$

In the embodiment shown in FIG. 4 in which the encoder 3 generates $N_k$ pulses per one rotation of the motor 1, the speed variation $N$ of the motor which generates speed variation of n1 pulses per one rotation (PPR) of the motor is shown by as follows:

$$N = A_{N1} \sin \frac{n \cdot n1}{N_k} 2\pi + B_{N1} \cos \frac{n \cdot n1}{N_k} \quad (5)$$

$$A_{N1} = \frac{1}{N_k \cdot n1} \sum_{n=1}^{N_k} nfn \sin \frac{n \cdot n1}{N_k} \cdot 2\pi \quad (6)$$

$$B_{N1} = \frac{1}{N_k \cdot n1} \sum_{n=1}^{N_k} nfn \cos \frac{n \cdot n1}{N_k} \cdot 2\pi \quad (7)$$

wherein, $N_k$ --- pulse numbers generated from the encoder per one rotation of the motor, nfn --- pulse speed between the n-1th pulse and the nth pulse, n and n1 --pulse speeds of the nth and $n_1$th pulses from the encoder.

Figure 5:
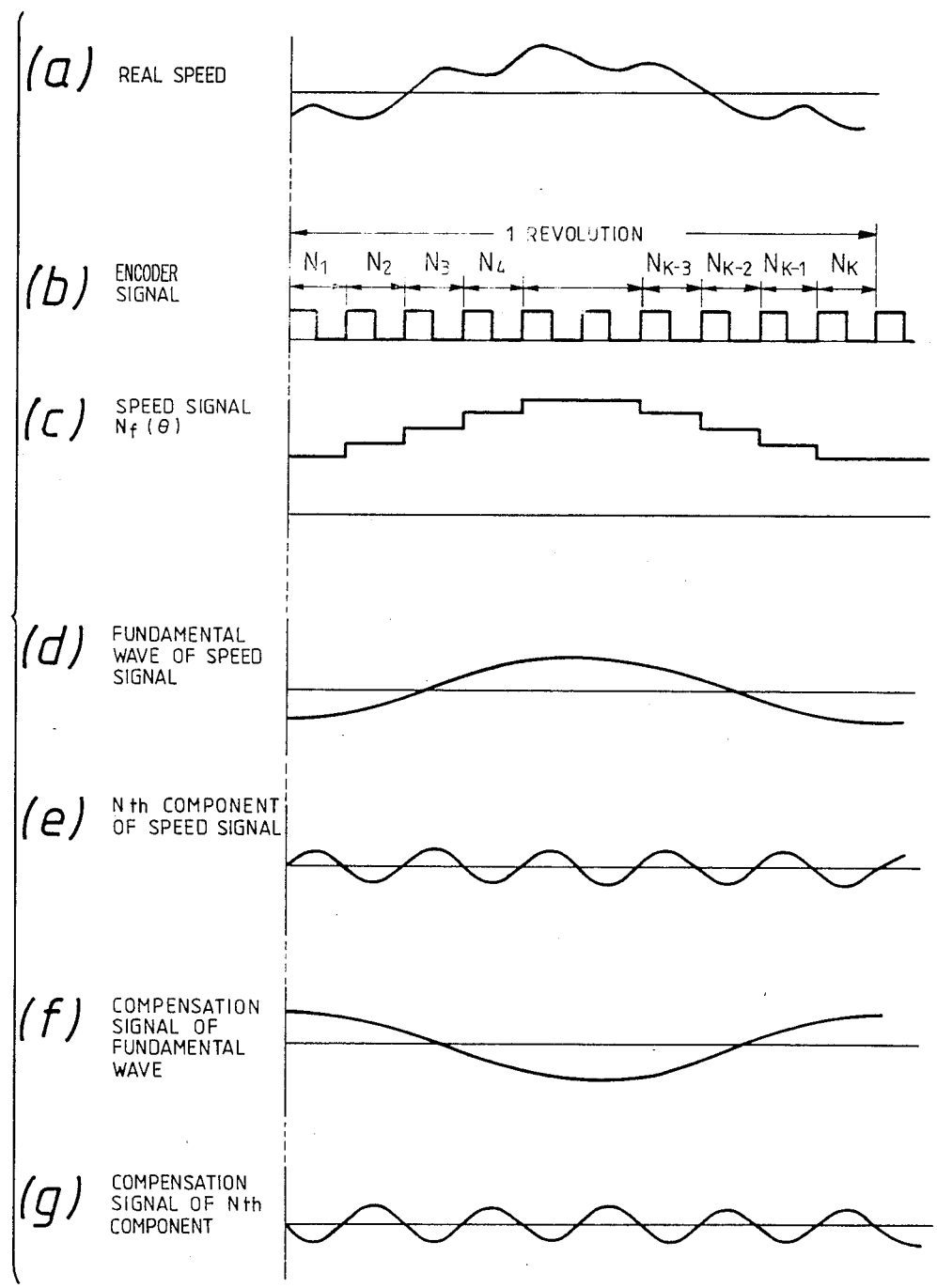
FIG. 5 illustrates wave forms for explaining the method of cancelling the speed ripple using an embodiment disclosed in FIG. 3.

FIG. 5 shows a method for cancelling the speed ripple per one rotation of the motor. In the next rotation of the motor, same variation mode is repeated.

Figure 4:
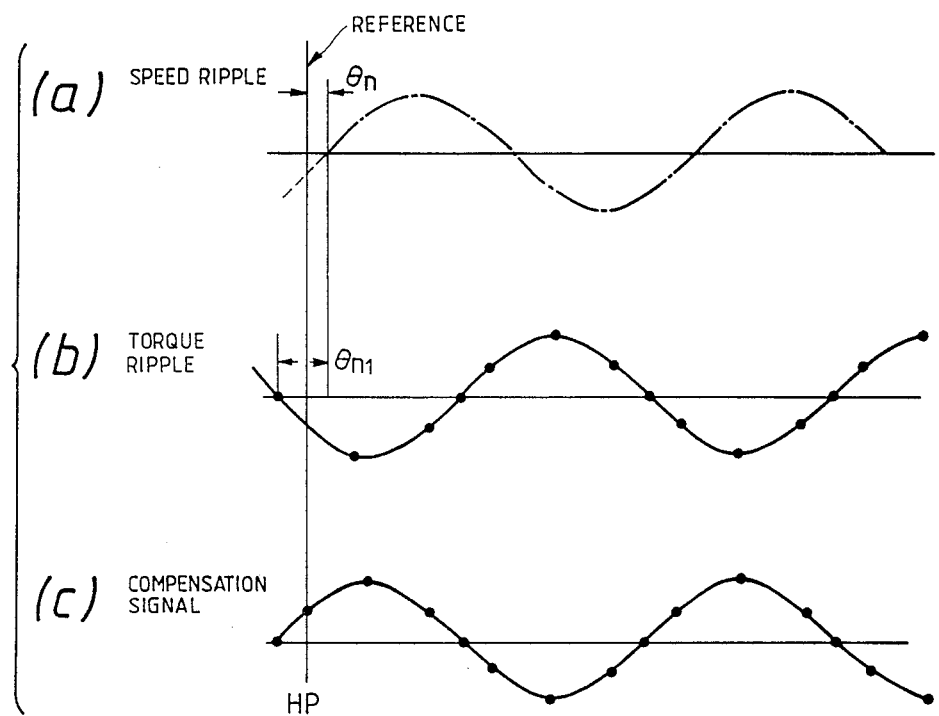
FIG. 4 illustrates a relationship between encoder signal and the speed signal.

The cardinal point of the calculation in the present invention is the basic point or the reference of the rotor shown in FIG. 4. The reference is detected by the first reference signal which is provided by the encoder 3 or the magnetic pole position detecting signal of the rotor which is provided by a hole element of the brushless motor. In a DC motor which does not use the encoder, the reference is detected by another element, for instance, by a gap sensor.

In the ripple detecting method explained above, a sine or cosine wave information is necessary. The information is previously stored at the ROM. In a drive type ripple detecting method which provides a sinusoidal wave current to each phase of the brushless motor, the sine or cosine wave information stored previously in the ROM can be utilized as the information.

Hereunder, we will explain the method of suppressing the torque ripple and canceling the speed ripple referring to FIGS. 4 and 5. FIGS. 4 and 5 show an example in which the torque ripple contains two frequency components. In case that many frequency components are included in the torque ripple, same method as explained in FIGS. 4 and 5 can be applied for removing the torque ripple. Since the speed ripple and the torque ripple contain many kind of frequency or harmonic wave components in many cases, the frequency components have to be removed, respectively.

The speed ripple or the speed variation can be detected as a waveform shown in FIG. 4(a) by processing the signal from the encoder 3 according to the formulae (5), (6) and (7). The zero cross point of the speed ripple is delayed by the phase difference $\theta_n$ from the reference HP. Actually, the detecting operation of one revolution of the speed ripple begins from the zero cross point. The torque ripple, which causes the speed ripple, is a counter phase to the speed ripple and is proceeded by $\theta_{n1}$ to the speed ripple as shown in FIG. 4(b). It is recognized that the speed ripple is not generated immediately by the effect of the inertia of the motor when the torque ripple is generated. By adding the compensation signal, which is the counter phase to the torque ripple as shown in FIG. 4(C), to a torque instruction signal or the current instruction signal, the torque ripple can be removed and the speed ripple or the speed variation can be suppressed. Although the value of the $\theta_{n1}$ is varied depending on the gain of the servo system, the inertia of the motor and the frequency of the torque ripple, it can be neglected in case of the low frequency components. Generally, it is preferable to decide $\theta_{n1}$ considering from the gain of the servo system. When the value of $\theta_{n1}$ is very small, sufficient effect can be expected to suppress the speed ripple by impressing the compensation signal of the counter phase to the speed ripple. In the same way, the speed ripple can be suppressed in low speed and low frequency harmonic wave components.

Hereunder we will explain a concrete method for reducing the speed ripple of the present invention referring to FIG. 5. FIG. 5(a) shows an actual speed variation mode of the motor. FIG. 5(b) shows that the speed detection is carried out one time in each pulse interval of the encoder signal. The speed signal (current signal) obtained at each pulse interval of the encoder signal shapes a digital stepwise waveform as shown in FIG. 5(c). FIG. 5(d) shows a fundamental wave component or the first component of the speed signal obtained from the waveform shown in FIG. 5(c). FIG. 5(e) shows the nth component of the speed signal obtained from the waveform shown in FIG. 5(c). These harmonic wave components shown in FIGS. 5(d) and 5(e) can be obtained easily by a well-known frequency analyzer. By adding the compensation signals or currents shown in FIGS. 5(f) and 5(g) to the speed signals, these harmonic wave components at the speed signal can be cancelled so that the torque ripple or the speed ripple caused by the harmonic wave components can be cancelled or reduced.

Figure 6:
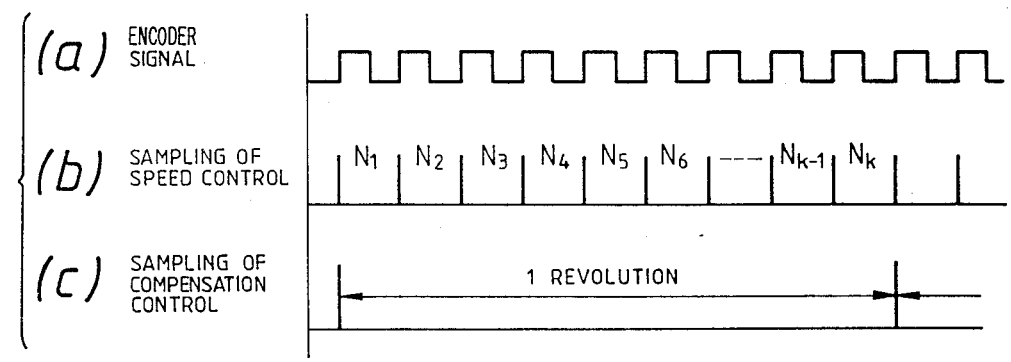
FIG. 6 shows sampling diagrams of signals from the frequency generator.

FIG. 6 shows one example in which the speed control system is structured in digital system. Generally, in the interval in which the VTR motor has to be controlled so as to be a constant rotational speed, the motor control is carried out in the pulse period or the several times interval thereof which is obtained from the encoder or the frequency generator (FG). FIG. 6 shows that the pulse period is equal to the speed control interval. When the $N_k$th speed control is going to be carried out based on the calculation at the microcomputer, the information of the $N_{k-1}$th signal period from the encoder or the frequency generator is used as the data. On the other hand, it is preferable that the sampling period of the compensation control is longer than the speed control. This is for calculating the phase and the absolute value of the speed ripple or speed variation within the respective speed control region of the $N_1$th, $N_2$th, --- $N_k$th according to the formulae (5) to (7) using the speed information from the $N_1$th to the $N_k$th and producing a new compensation signal after the $N_k$th sampling. Namely, it is simple that the compensation signal of same phase and absolute value is produced from the $N_1$th to the $N_k$th sampling intervals. Especially, according to the control method, it is not necessary to store the independent speed informations from the $N_1$th to the $N_k$th sampling intervals to the respective RAM regions so that the RAM capacity can be reduced remarkably in the low frequency component in the encoder signal. On the other hand, when many frequency components are included in the encoder signal, it is preferable that the compensation control period for each frequency component is varied. In high frequency component, it is preferable that the sampling numbers of the speed control are many. Especially, the responsibility for the high frequency component can be improved remarkably by making the compensation control period preferable one for its frequency component.

Figure 7:
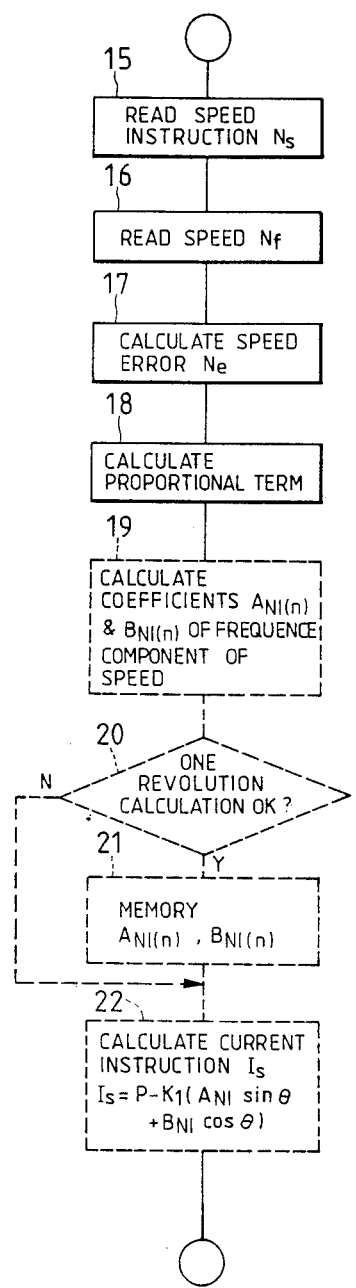
FIG. 7 shows a flow chart of a microcomputer for reducing the speed variation of the movable equipment using an embodiment disclosed in FIG. 3.

FIG. 7 shows a flow chart for practicing the control procedure of the present invention using the microcomputer. Referring to the flow chart, in steps 15 and 16, the speed instruction signal $N_s$ and the speed $N_f$ are read. In step 17, the speed error $N_e$ is calculated from the speed instruction signal $N_s$ and the actual speed signal $N_f$ by the calculation of $N_e = N_s - N_f$. In step 18, the proportional term P is calculated for the proportional control by the calculation of $P = K \cdot N_e$, wherein K is a coefficient. In step 19, the calculation of coefficients $A_{N1}(n)$ and $B_{N1}(n)$ is carried out according to the formulae (6) and (7). In step 20, it is detected whether the calculation for one rotation of the motor is finished or not. When the calculation of one rotation of the motor is finished, $A_{N1}(n)$ and $B_{N1}(n)$ are memorized to the RAM in step 21. In step 22, the added value of the output signal of the PI controller 14 and the compensation signal $I_c$ is outputted as the current instruction signal $I_s$. In the calculation in step 22, the previous coefficients $A_{N1}(n-1)$ and $B_{N1}(n-1)$ are used. The angle $\theta$ is obtained from the pulse counter of the frequency generator 3.

Next, we will explain the method that the two phase brushless motor is driven by a sinusoidal wave current. When the stator windings have $\alpha$ phase and $\beta$ phase windings which differ 90 degrees in electrical angle each other; the signals of $\sin \alpha$ and $\cos \alpha$, which are position patterns corresponding to the rotation angle $\theta$ of the rotor, are impressed to the $\alpha$ phase and $\beta$ phase windings; and the current instruction signal $I_s \sin \alpha$ or $I_s \cos \alpha$, which is obtained from the current instruction signal $I_s$ of the speed control system, is provided to each winding $\alpha$ and $\beta$; the induced voltages $E_o \sin \alpha$ and $E_o \cos \alpha$ are generated to the winding $\alpha$ and winding $\beta$ respectively. In this case, the motor torque can be shown as follows:

$$T = [I_s \sin\alpha \cdot E_o \sin\alpha + I_s \cos\alpha \cdot E_o \cos\alpha]/K \cdot \omega = I_s \cdot E_o/K \cdot \omega \quad (8)$$

wherein, $\omega$ --- motor speed, $K_t$ --- torque constant, k ---coefficient.

As apparent from the formula (8), the motor torque is constant without respect to the rotational angle of the rotor.

When an amplifier has an offset for providing a current instruction to the windings $\alpha$ and $\beta$, the following effect occurs. Hereunder, we will explain in case that DC component is also imposed to the winding $\alpha$. In this case, the motor torque T is as follows:

$$T = [(I_s \sin\alpha + I_o) \cdot E_o \sin\alpha + I_s \cos\alpha \cdot I_o \cos\alpha]/K \cdot \omega = I_s I_o/K\omega + I_o E_o \sin\alpha/K\omega \quad (9)$$

Accordingly, the pulsation expressed by the second term of the formula (9) is generated.

When the mechanical angle between the reference of the stator and that of the rotor is $\theta$, the second term $\alpha$ can be expressed as $\alpha = P/2\theta$, wherein P is pole numbers. When the rotor rotates one period, the pulsation of P/2 times is generated.

Accordingly, the torque ripple of P/2 PPR (pulse per revolution) is generated so that the motor generates the speed ripple.

To this brushless motor which generates the torque ripple of P/2 PPR, the present invention can be applied.

The speed ripple or the torque ripple of the P/2 PPR component can be reduced in such a manner that the speed ripple of the P/2 PPR is calculated by the formulae (5) to (7), and the reciprocal of the DC component of the speed ripple is added to the instruction current signal to the windings $\alpha$ and $\beta$.

In this case, the compensation of the instruction current signal can be carried out by cancelling the DC component so that the calculation of the compensation is simple, the time required to calculate the compensation value is short, and the capacity of the RAM can be reduced.

The present invention is applied not only to a single motor but also to remove the speed pulsation of the motor connected to the load. The present invention can be also applied to a static equipment in which harmonic wave component thereof causes a drawback. The present invention can be also applied to a linear type motor.

Figure 8:
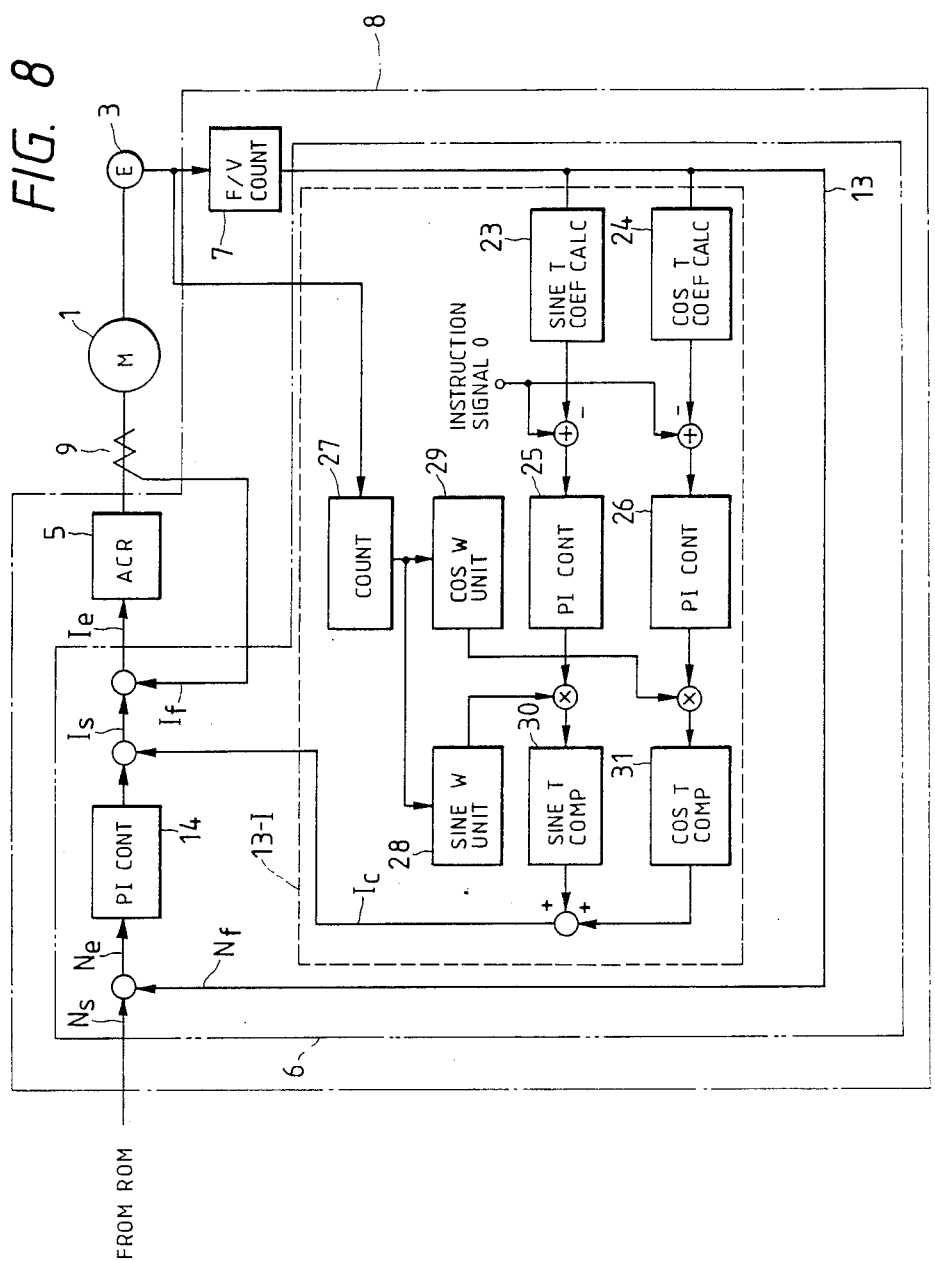
FIG. 8 is the second circuit diagram showing a compensation signal producing means in FIG. 1.

Referring to FIG. 8, the whole structure of FIG. 8 is similar to FIG. 3 except the compensation signal generating means 13 shown by the dotted line 13-I in FIG. 8. The sine T coefficient calculator 23 and the cosine T coefficient calculator 24 calculate the sine term coefficient $A_{N1}$ and the cosine term coefficient $B_{N1}$ according to the formulae (6) and (7). The proportional-plus-integral values of the deviation values between the coefficients $A_{N1}$ and $B_{N1}$, and the instruction sine term coefficient and the instruction cosine term coefficient are calculated respectively at the PI controller 25 and the PI controller 26 when the instruction sine term coefficient and the instruction cosine term coefficient are taken as zero for calculating the compensation sine term coefficient $C_{N1}$ and the compensation cosine term coefficient $D_{N1}$. The counter 27 counts the angle $\theta$ which corresponds to $$\frac{n \cdot n1}{N_k} \cdot 2\pi$$

in the formulae (6) and (7). The sine wave unit 28 and the cosine wave unit 29 calculate $\sin \theta$ and $\cos \theta$ respectively. The sine term compensator 30 and the cosine term compensator 31 calculate $C_N \sin \theta$ and $D_N \cos \theta$ by multiplying the coefficient $C_N$ and $\sin \theta$, and the coefficient $D_N$ and $\cos \theta$, respectively. The compensation signal $I_c$ is calculated as a compensation signal $E_N$ by the formula of $E_N = C_N \sin \theta + D_N \cos \theta$. The compensation signal $I_c$ is added to the current instruction signal $I_s$. In FIG. 8, only one compensation signal generating means 13-I is disclosed. However, the present invention can be applied to have many compensation signal generating means for many harmonic wave components.

Figure 9:
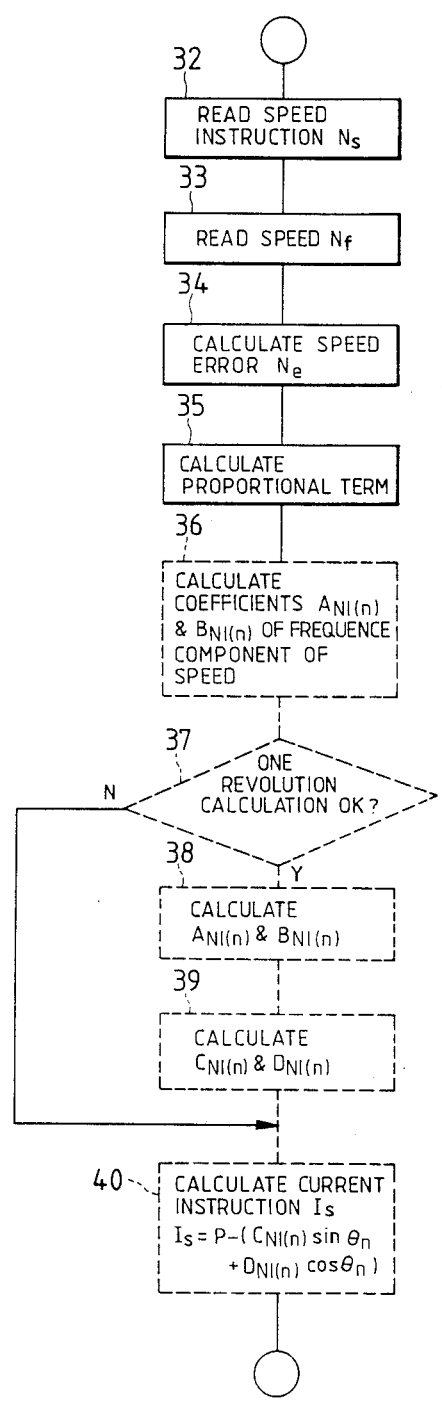
FIG. 9 shows a flow chart of a microcomputer for reducing the speed variation of the movable equipment using an embodiment disclosed in FIG. 8.

Referring to FIG. 9, step 32–37 are same to steps 15–20 in FIG. 7. In step 38, the sine term coefficient $A_{N1}(n)$ and the cosine term coefficient $B_{N1}(n)$ are memorized to the RAM. In step 39, the sine term compensation value $C_{N1}(n)$ and the cosine term compensation value $D_{N1}(n)$ are calculated and stored to the RAM. In step 40, the current instruction signal $I_s$ is calculated.

Figure 10:
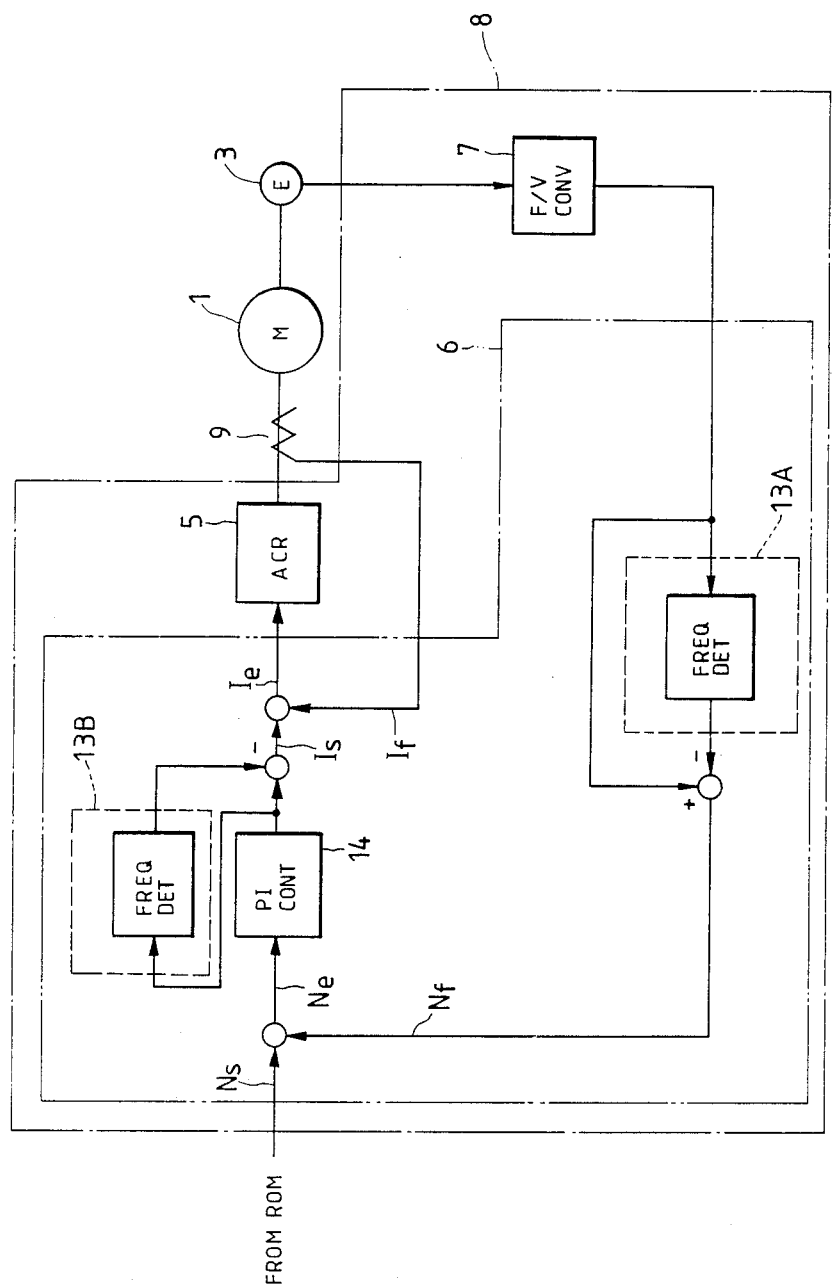
FIG. 10 is the third circuit diagram showing a compensation signal producing means in FIG. 1.

Referring to FIG. 10, the whole structure of FIG. 10 is similar to FIG. 3 except the harmonic wave component detecting means or the frequency detector 13A or 13B shown in FIG. 10. Ordinarily, either 13A or 13B is used.

Namely, arbitrary frequency or harmonic wave component included in the detected speed $N_f$ is calculated by comparing the previously detected more than two speeds, for instance, such as last and the last before speeds using the formula (1). The arbitrary frequency component, for instance, such as error frequency of the frequency generator 3 can be removed by reducing the speed variation calculated from the formula (5). Concerning the harmonic wave component detecting means 13B, it is connected immediately after the PI controller 14 as shown in FIG. 10 or immediately before the PI controller 14 although not shown in FIG. 10 for attaining an effect as well as the harmonic wave component detecting means 13A.

Figure 11:
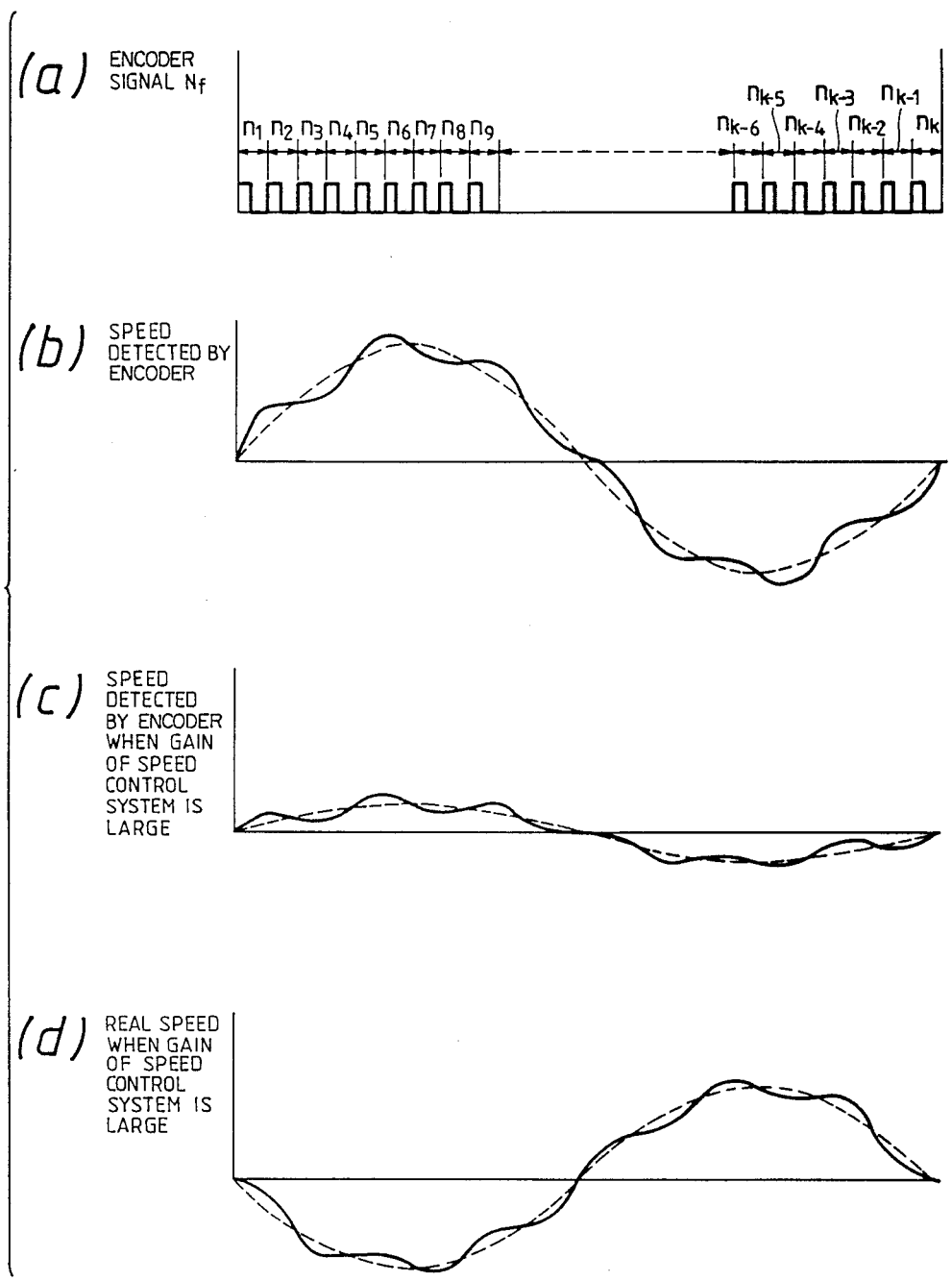
FIG. 11 illustrates wave forms for explaining the method of cancelling the speed ripple using an embodiment disclosed in FIG. 10.

FIG. 11(a) shows a FG pulse period $N_f(\theta)$ per one rotation of the motor detected by the speed detecting circuit 7 when the gain K of the speed control system is selected comparatively small. The detected speed $N_f$ is calculated as $K/nf(\theta)$ within the microcomputer by the FG pulse period $nf(\theta)$. FIG. 11(b) shows the speed ripple of the detected speed $Nf(\theta)$. FIG. 11(b) exemplifies the speed ripple in which 1 PPR component caused by an installation accuracy of a sensor and 6 PPR component produced by the motor itself are included. In FIGS. 11(b), 11(c) and 11(d), the dotted line shows a fundamental wave component. When the gain of the speed control system is made large, the speed ripple caused by the 1 PPR component and the 6 PPR component becomes small as shown in FIG. 11(c), especially the 1 PPR component becomes small. However, the actual motor speed contains the 1 PPR component largely as shown in FIG. 11(d), since the 1 PPR component is the error component of the sensor. When the 1 PPR component is not affected by other factors, for instance when the balance of the motor is kept in a good condition and the driving torque ripple is small, the error of 1 PPR of the sensor can be removed by maintaining the 6 PPR component sufficiently small and removing the 1 PPR component of the detected speed shown in FIG. 11(c). Namely, it is not the speed ripple detected by the frequency generator but the speed ripple of the actual speed that is removed from the motor by removing the 1 PPR component of the detected speed.

By the same operation to the current instruction signal or the speed error, the error of the sensor can be made small. In actual case, the error of 1 PPR component of the speed sensor can be removed by dealing with that either one of the detected speed, the current instruction signal, or the speed error of the speed control system is not active to the 1 PPR component contained in the sensor.

The function of the frequency detector 13A or 13B will be explained by referring to the formulae (1) to (7).

The error harmonic wave component of the speed sensor can be removed from the speed ripple by subtracting the speed variation N shown by the formula (5) or the magnitude of the frequency component from the original speed by the frequency detector 13A or 13B disclosed in FIG. 10.

Figure 12:
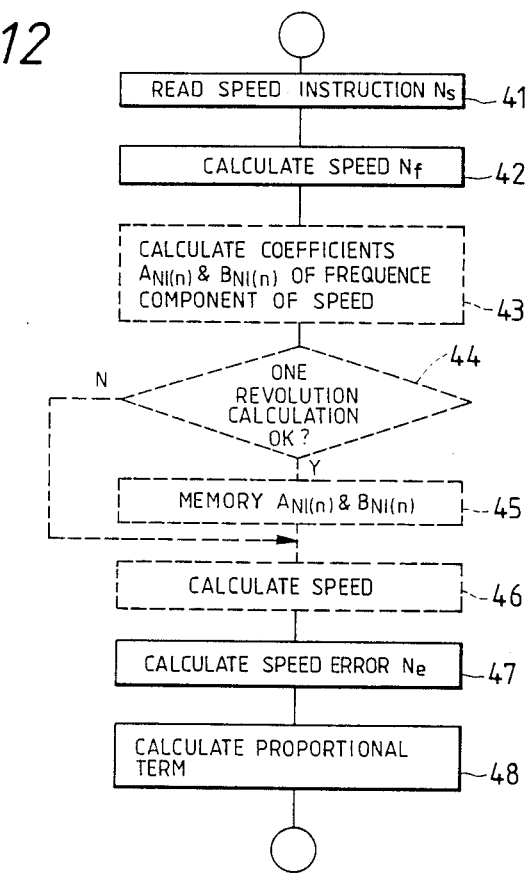
FIG. 12 shows a flow chart of a microcomputer for reducing the speed variation of the movable equipment using an embodiment disclosed in FIG. 10.

Referring to FIG. 12, steps 41 and 42 correspond to steps 15 and 16 in FIG. 12. Step 43 corresponds to step 19 in FIG. 12. Steps 44 and 45 correspond to steps 20 and 21 in FIG. 7. In step 46, the magnitude N of the frequency component is calculated by the formula (5). In step 47, the speed error $N_e$ is calculated by $N_e = N_s - N_f$. In step 48, the proportion term P is calculated by $P = K \cdot N_e$, wherein K is a proportion term gain.

By the calculation shown in the flow chart of FIG. 12, the speed ripple caused by the error of the speed sensor can be removed.

In the above embodiment, we explained the procedure for removing the error of the speed sensor. The same procedure can be applied in the case that the outer noise such as a power source noise of 50 HZ or 100 HZ is included in the speed control loop so that the speed control loop is affected by the noise. However, in this case, the compensation to the time harmonic wave or the frequency component is necessary instead of the compensation of the harmonic wave component to the rotational positions.

Namely, when the noise component is 50 HZ, 50 HZ contained in the speed control loop is calculated and the compensation to the component is demanded.

According to the above embodiment, the error contained in the speed sensor and caused by the installation of the sensor, and the speed ripple and the vibration caused by the resonance of the outer noise system can be removed from the speed control apparatus.

Figure 13:
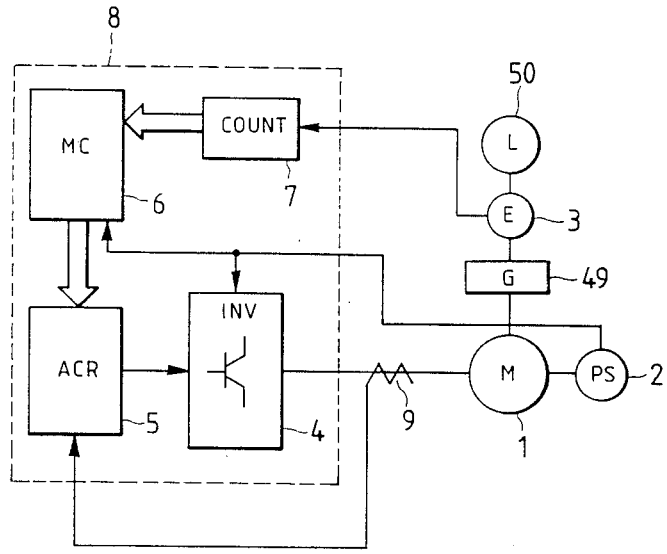
FIG. 13 is a block diagram showing another embodiment of the present invention.

FIG. 13 shows a speed control apparatus in which the movable equipment is the brushless motor. The difference between FIG. 13 and FIG. 1 is that the motor 1 is connected to the transmitter 49 and the driving portion 50, and it varies its speed in the connection of an road.

The speed control apparatus shown in FIG. 13 is controlled by that shown in FIG. 3, 8, or 10.

Figure 14:
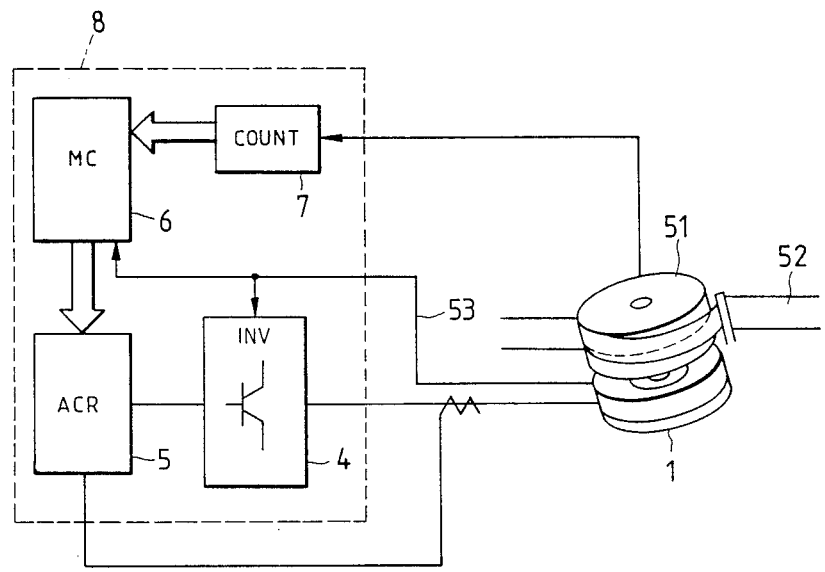
FIG. 14 is a block diagram showing a further embodiment of the present invention.

FIG. 14 shows another embodiment of the present invention. In FIG. 14, the same parts as in FIG. 13 are indicated by the same symbol. In FIG. 14, the transmitter comprises a cylinder 51, the driven portion comprises a magnetic tape 52. 53 denotes a position detecting signal.

Figure 15:
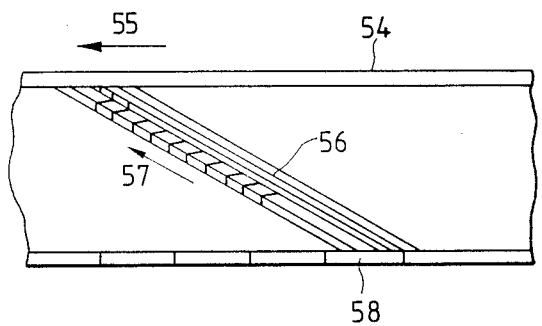
FIG. 15 illustrates a magnetic tape for explaining an embodiment of FIG. 14.

Referring to FIG. 15, a magnetic tape 52 of the video tape recorder (VTR) is divided into an audio track 54, an image track 56 and a control track 58. The audio track 54, the image track 56 and the control track 58 are recorded by an audio signal, an image signal and a control signal respectively.

The speed detection can be utilized either one signal recorded at any tracks. However, the most high discrimination signal is the image signal recorded on the image track 56. In this case, the speed detection is carried out by detecting the image signal recorded on the magnetic tape using a rotation head (not shown) disposed on a cylinder (not shown). Namely, the speed of the motor 1 is detected by a period of a horizontal synchronized signal of the image signal. In FIG. 15, 55 denotes a tape running direction and 57 a video head rotation direction.

The speed control and the compensation of the speed ripple in the embodiment of FIG. 14 can be carried out by the method shown in FIG. 3, 8, or 10.

What we claim is:

1. A speed control apparatus for a movable equipment, comprising:
   a speed detector for detecting a moving speed of the movable equipment;
   speed control means for providing a current or voltage instruction signal to the movable equipment based on a deviation value between a detected speed signal obtained from the speed detector and a speed instruction signal;
   said speed control means comprising:
   a driver for providing a current or voltage signal to said movable equipment corresponding to the magnitude of said current or voltage instruction signal;
   a speed detecting circuit for detecting the moving speed based on the detected speed signal from said speed detector; and
   an arithmetic unit for providing a deviation signal by comparing said speed instruction signal and a speed signal obtained from said speed detecting circuit, corresponding to said detected speed signal from said speed detector, and for driving said driver based on said deviation signal;
   said arithmetic unit comprising:
   harmonic wave component detecting means for detecting a harmonic wave component included in a speed variation mode which is obtained from the speed detecting circuit; and
   compensation means for supplying a compensation value to said driver so as to decrease the harmonic wave component, detected by the harmonic wave component detecting means, from said deviation signal.

2. A speed control apparatus according to claim 1, wherein said compensation means adds said compensation value, which is in an opposite phase of the detected harmonic wave component, to said driver.

3. A speed control apparatus according to claim 1, wherein said movable equipment comprises an electric motor which enables rotational or linear movement.

4. A speed control apparatus according to claim 3, wherein said electric motor comprises a brushless motor.

5. A speed control apparatus according to claim 1, wherein said arithmetic unit calculates a sine term coefficient $A_{N1}$ of the harmonic wave component and a cosine term coefficient $B_{N1}$ of the harmonic wave component by following formulae:

$$A_{n1} = K \sum_{n=1}^{N_k} V_n \sin \frac{n \cdot n1}{N_k} \cdot 2\pi$$

$$B_{n1} = K \sum_{n=1}^{N_k} V_n \cos \frac{n \cdot n1}{N_k} \cdot 2\pi$$

wherein, K is a coefficient, $V_n$ is the speed detected by said speed detector, n is a pulse speed of a nth pulse of said speed detector and $n_1$ is a pulse speed of the $n_1$th pulse of said speed detector, and said arithmetic unit calculating proportional-plus-integral values of $A_{N1}$ and $B_{N1}$ respectively so as to add the proportional-plus-integral values to said compensation means.

6. A speed control apparatus according to claim 1, wherein said arithmetic unit calculates a sine term coefficient $A_{N1}$ of the harmonic wave component and a cosine term coefficient $B_{N1}$ of the harmonic wave component by following formulae:

$$A_{n1} = K \sum_{n=1}^{N_k} V_n \sin \frac{n \cdot n1}{N_k} \cdot 2\pi$$

$$B_{n1} = K \sum_{n=1}^{N_k} V_n \cos \frac{n \cdot n1}{N_k} \cdot 2\pi$$

wherein, K is a coefficient, $V_n$ is the speed detected by said speed detector, $N_k$ is a pulse speed of one rotation of said speed detector, n is a pulse speed of a nth pulse of said speed detector and $n_1$ is a pulse speed of a $n_1$th pulse of said speed detector, said arithmetic unit calculating proportional-plus-integral values of deviation values between the coefficients $A_{N1}$ and $B_{N1}$, and an instruction sine term coefficient and an instruction cosine term coefficient respectively when the instruction sine term coefficient and the instruction cosine term coefficient are taken as zero for calculating a compensation sine term coefficient $C_N$ and a compensation cosine term coefficient $D_N$, and said arithmetic unit calculating values obtained by multiplying the coefficient $C_N$ and sine value, and the coefficient $D_N$ and cosine value respectively so as to add the values to said compensation means.

7. A speed control apparatus according to claim 6, wherein said movable equipment is a brushless motor driven by a sine wave current and said current instruction signal is used for a sine wave information for calculating said compensation value of said compensation means.

8. A speed control apparatus according to claim 6, wherein said driver comprises an inverter and said speed detecting circuit comprises a counter.

9. A speed control apparatus according to claim 6, wherein said speed detecting circuit comprises a counter and detects the speed based on a reciprocal of a pulse period of an encoder provided at said movable equipment so as to control the speed of said movable equipment based on a detected value of the reciprocal.

10. A speed control apparatus for a movable equipment, comprising:
  control means for controlling movement of the movable equipment and providing an instruction speed signal;
  a driver for providing a current or voltage signal to the movable equipment in accordance with the instruction speed signal;
  a speed detector for detecting a moving speed of the movable equipment and providing an output indicative thereof;
  said control means including harmonic wave component detecting means for detecting a harmonic wave component included in a speed variation mode of the output from said speed detector, and compensation means for calculating a proportional-plus-integral value of each detected harmonic wave component, the compensation means including means for calculating a current value obtained by proportional-plus-integral control of a speed deviation signal between the instruction speed signal and an actual speed signal obtained as the output of the speed detector, and means for adding the proportional-plus-integral value and the current value so as to provide an output signal thereof as an output signal of the compensation means, the driver being responsive to the output signal of the compensation means for being driven thereby.

11. A speed control apparatus for movable equipment, comprising:
  a speed detector for detecting a moving speed of the movable equipment;
  speed control means for providing a current or voltage instruction signal to the movable equipment based on a deviation value between a detected speed signal obtained from the speed detector and a speed instruction signal;
  said speed control means comprising:
  a driver for providing a current or voltage signal to the movable equipment corresponding to the magnitude of the current or voltage instruction signal;
  a speed detecting circuit for detecting the moving speed based on the detected speed signal from the speed detector; and
  an arithmetic unit for providing a deviation signal by comparing the speed instruction signal and a speed signal obtained from the speed detecting circuit, corresponding to the detected speed signal from the speed detector, and for driving the driver based on the deviation signal;
  the arithmetic unit comprising:
  calculating means for providing a drive signal for the driver by multiplying the deviation signal and a gain;
  detecting means for detecting a harmonic wave component included in the detected speed signal, the deviation signal, or the current instruction signal based on at least two preceding detected speeds, deviation signals or current instruction signal; and
  compensation means for reducing the detected harmonic wave component included in the detected speed, the deviation signal or the current instruction signal from said drive signal.

12. A speed control apparatus according to claim 11, wherein said movable equipment comprises an electric motor which enables rotational or linear movement.

13. A speed control apparatus for a movable equipment wherein the movable equipment includes a driving portion, a transmitter and a driven portion connected to the driving portion, comprising:
  a speed detector for detecting at least a moving speed of the driven portion of the movable equipment; and
  speed control means for providing a current or voltage instruction signal to the movable equipment based on a deviation value between a detected speed signal obtained from the speed detector and a speed instruction signal;
  the speed control means comprising:
  a driver for providing a current or voltage signal to the movable equipment corresponding to a magnitude of the current or voltage instruction signal;
  a speed detecting circuit for detecting the moving speed based on the detected speed signal from the speed detector; and
  an arithmetic unit for providing a deviation signal by comparing the speed instruction signal and a speed signal obtained from the speed detecting circuit, corresponding to the detected speed signal from the speed detector, and for driving the driver based on the deviation signal;
  the arithmetic unit comprising:
  harmonic wave component detecting means for detecting a harmonic wave component included in a speed variation mode which is obtained from the speed detecting circuit; and
  compensation means for supplying a compensation value to the driver so as to decrease the harmonic wave component detected by the harmonic wave component detecting means from the deviation signal.

14. A speed control apparatus according to claim 13, wherein said compensation means provides said compensation value, which is an opposite phase of the detected harmonic wave component, to said driver.

15. A speed control apparatus of a movable equipment according to claim 13, wherein said movable equipment enables rotational or linear movement.

16. A speed control apparatus according to claim 15, wherein said movable equipment comprises a brushless motor.

17. A speed control apparatus according to claim 13, wherein said driven portion comprises a video tape and said speed signal is a position signal recorded on the tape.

18. A speed control apparatus according to claim 17, wherein said speed signal is a vertical synchronous signal or a horizontal synchronous signal recorded on said tape.

* * * * *